United States Patent [19]

Suwa et al.

[11] Patent Number: 4,891,726
[45] Date of Patent: Jan. 2, 1990

[54] ROTARY MAGNETIC HEAD AND GUIDE DRUM ASSEMBLY WITH REDUCE MOUNTING HEIGHT

[75] Inventors: Hisashi Suwa, Kanagawa; Seiji Sato, Kanagawa; Susumu Matsubara, Kanagawa; Eiji Yano, Tokyo; Katsuyuki Koizumi, Kanagawa, all of Japan

[73] Assignee: Sony Corporation, Tokyo, Japan

[21] Appl. No.: 339,859

[22] Filed: Apr. 17, 1989

Related U.S. Application Data

[63] Continuation of Ser. No. 130,329, Dec. 8, 1987, abandoned.

[30] Foreign Application Priority Data

Dec. 30, 1986 [JP] Japan ............................... 61-312917

[51] Int. Cl.$^4$ .............................................. G11B 15/60
[52] U.S. Cl. .................................. 360/130.23; 360/84
[58] Field of Search ............ 360/104, 107, 108, 130.22, 360/130.23, 130.24, 84, 85, 129, 95

[56] References Cited

U.S. PATENT DOCUMENTS

| 4,117,519 | 9/1978 | Shioyama et al. | 360/84 |
| 4,347,536 | 8/1982 | Miyashita et al. | 360/130.22 X |
| 4,366,516 | 12/1982 | Ogata et al. | 360/84 |
| 4,490,759 | 12/1984 | Maruyama | 360/107 |
| 4,611,255 | 9/1986 | Ushiro et al. | 360/107 X |
| 4,654,738 | 3/1987 | Kato et al. | 360/108 |

FOREIGN PATENT DOCUMENTS

| 0090375 | 10/1983 | European Pat. Off. | 360/84 |
| 0034355 | 3/1980 | Japan | 360/108 |
| 0198531 | 12/1982 | Japan | . |
| 0242317 | 10/1986 | Japan | 360/130.24 |
| 0242362 | 10/1986 | Japan | 360/130.24 |

Primary Examiner—Robert S. Tupper
Assistant Examiner—Andrew L. Sniezek
Attorney, Agent, or Firm—Lewis H. Eslinger; Jay H. Maioli

[57] ABSTRACT

The present invention is concerned with a helical scan type rotary magnetic head device employed for example in a video tape recorder in which the magnetic tape is caused to run obliquely while it contacts the head and in which recording tracks are formed on the magnetic tape at a predetermined angle of inclination relative to the tape. According to the present invention, the tape guide drum along the side of which the magnetic tape is caused to run while contacting with it has a cut-out at its portion free of contact with the magnetic tape, while a rotary transformer adapted for receiving and transmitting recording and/or reproducing signals at or from a rotary magnetic head is mounted so as to be enclosed within the interior of the tape guide drum to reduce the size and thickness of the rotary magnetic head device.

7 Claims, 3 Drawing Sheets

ROTARY MAGNETIC HEAD AND GUIDE DRUM ASSEMBLY WITH REDUCE MOUNTING HEIGHT

This is a continuation of application Ser. No. 07/130,329, filed Dec. 8, 1987, now abandoned.

FIELD OF THE INVENTION

This invention relates to a rotary magnetic head device employed in a helical scan type video tape recorder in which the magnetic tape is caused to run obliquely in contact with the head drum or guide drum and in which record tracks are formed at a predetermined angle of inclination with respect to the magnetic tape.

A video tape recorder, especially a portable one, is required to be reduced in size and weight. The rotary magnetic head device, which is the main mechanism of the video tape recorder, is one of the mechanisms significantly influencing such reduction in size and weight of the video tape recorder.

The rotary magnetic head device described in the Japanese Laid-open Patent Publication No. 198531/1982, for example, has been proposed with the aim of reducing the size and weight of the video tape recorder. In the head device described in this Laid-open Patent Publication, the bearing housing supporting the stationary drum portion of the guide drum of the tape recorder with respect to the rotary shaft is formed substantially within the interior of the stationary portion to reduce the size of various components such as the rotary shaft bearing housing, while a flat type motor is used as the driving electric motor to reduce the overall length and the thickness of the rotary magnetic head mechanism.

However, in recent video tape recorders, it is required to reduce the size and weight further. Above all, in a so-called 8 mm VTR making use of a magnetic tape with a tape width of 8 mm as the recording medium, since it has been tried to reduce the size of the tape cassette, a strong demand is raised for reducing the size and thickness of the video tape recorder itself. In such 8 mm VTR, it has been proposed to reduce the loading area for the magnetic tape by setting the mounting positions of the tape cassette and the magnetic head device in closer proximity to each other for further reducing the size of the VTR.

There is also present in the art an 8 mm VTR wherein a recess provided for engaging with a loading unit of the tape recorder on the front surface of the tape cassette adapted to be covered by a front cover is partially confronted by a rotary magnetic head device, for reducing the size of the VTR further.

In such 8 mm VTR, for reducing the size of the loading area for the magnetic tape and simultaneously reducing the thickness of the VTR further, it is required to reduce the size and thickness of the rotary magnetic head device which is contacted by the magnetic tape reeled out of the tape cassette and which is adapted to record and/or reproduce predetermined information signals on or from the magnetic tape.

OBJECT OF THE INVENTION

It is therefore an object of the present invention to provide a rotary magnetic head device wherein further reduction in size and thickness of the device not achieved in the conventional rotary magnetic head device is achieved to thereby reduce the size of the video tape recorder further. According to the present invention, that portion of the third tape guide drum mounted above the second tape guide drum in turn mounting the magnetic head which is not contacted with the magnetic tape is formed with cut-out, such that, by having the cut-out positioned at the highest point from the tape cassette attachment surface when the rotary magnetic head device is mounted at an angle relative to the tape cassette attachment surface in the usual manner, the mounting height of the rotary magnetic head may be lowered.

According to the present invention, the tape cassette is adapted to be intruded into the rotary magnetic head device without abutment of the upper surface of the front cover by having the recessed part of the tape cassette intruded at the recessed part or cut-out. This cut-out is provided at the portion of the third tape guide drum not contacted by the magnetic tape, so as not to impede the guiding of the magnetic tape running about the periphery of the rotary magnetic head device.

According to the present invention, the rotary transformer is provided within the interior of the second and third tape guide drums in a facing relation thereto, the overall height may be lowered to reduce the thickness of the rotary magnetic head device.

Also, according to the present invention, the frequency generator adapted for sensing the rotational speed of the second tape guide drum is mounted at such a position as to reduce the height of the rotary magnetic head device.

In view of the above object, the present invention provides a helical scan type rotary magnetic head device employed for example in a video tape recorder in which the magnetic tape is caused to run obliquely while it contacts the head and in which recording tracks are formed on the magnetic tape at a predetermined angle of inclination relative to the tape, wherein the tape guide drum along the side of which the magnetic tape is caused to run while contacting therewith has a cut-out at its portion free of contact with the magnetic tape, while a rotary transformer adapted to receive and transmit recording and/or reproducing signals at or from a rotary magnetic head is mounted so as to be enclosed within the interior of the tape guide drum to reduce the size and thickness of the rotary magnetic head device.

DESCRIPTION OF PREFERRED EMBODIMENTS

Reference is made to the accompanying drawings showing preferred illustrative embodiments of the present invention.

Figure 1:
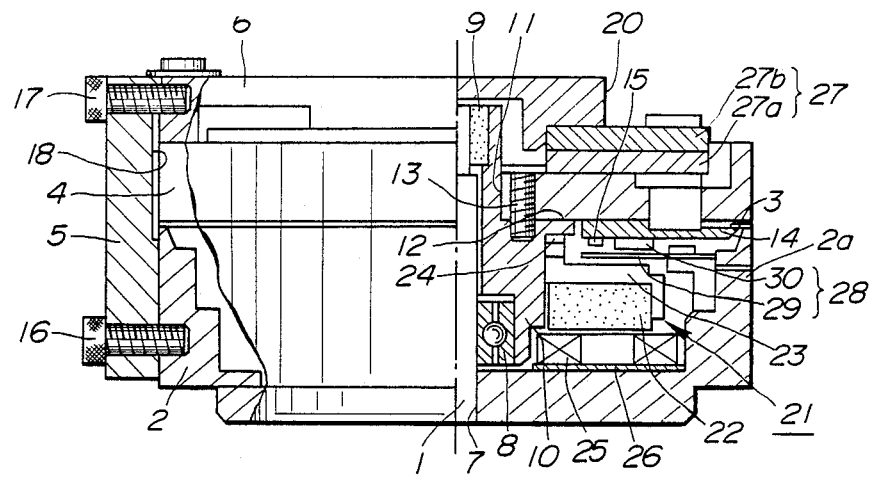
FIG. 1 is a partial longitudinal sectional view of a rotary magnetic head device according to an embodiment of the present invention.

Referring first to FIG. 1, the magnetic head device according to the present invention is made up of a first tape guide drum 2 fixedly supported by a supporting shaft 1, a second tape guide drum 4 supported for facing to the first tape guide drum 2 and for rotation relative to the supporting shaft 1 and mounting a magnetic head 3, and a third tape guide drum 6 mounted for facing to the second tape guide drum 4 and securely connected through a connecting member 5 to the first tape guide drum 2.

The first tape guide drum 2 is securely mounted to the supporting shaft 1 by having the lower end of the shaft 1 fitted into a mating opening 7 formed centrally of the guide drum 2.

The second tape guide drum 4 has a central opening 11 through which is passed a bearing housing 10 which is mounted for rotation relative to the supporting shaft 1 through a slide bearing 9 such as a bearing and a metal bearing, not shown, while the drum 4 has its inner peripheral edge resting on a shoulder 12 formed halfway in the bearing housing, and is secured thereto by a mounting screw 13, in such a fashion that the tape guide drum 4 may be rotated in unison with the bearing housing 10. The magnetic head 3 is mounted on a head attachment plate 14 mounted to the lower side of the second tape guide drum 4 facing to the first tape guide drum 2, so that the magnetic head 3 may be rotated in unison with the second tape guide drum 4. The second tape guide drum 4 may be rotated relative to the supporting shaft 1, as mentioned hereinabove. In the present embodiment, the head attachment plate 14 is secured to the second tape guide drum 4 by a set screw 15 which is introduced from the lower side of the second tape guide drum. The magnetic head 3 is attached to the upper surface of the head attachment plate 14 facing to the lower side of the second tape guide drum 4.

The third tape guide drum 6 has its central part abutting on the foremost part of the supporting shaft 1, while the connecting member 5 having its one end secured to the lateral side of the first tape guide drum 2 by a set screw 16 has its other end secured to the drum 6 by set screws 17, in such a manner that the third tape guide drum 6 is securely connected to the first tape guide drum 2. In this manner, the first and third tape guide drums 2 and 6 are secured to the supporting shaft 1. The portion of the connecting member 5 straddling the second tape guide drum 4 has a cut-out or recess 18 so as not to interfere with rotation of the second tape guide drum 4 and also so as not to injure the foremost part of the magnetic head 3 slightly projected during the rotation thereof from the outer peripheral surface of the second tape guide drum 4.

Figure 2:
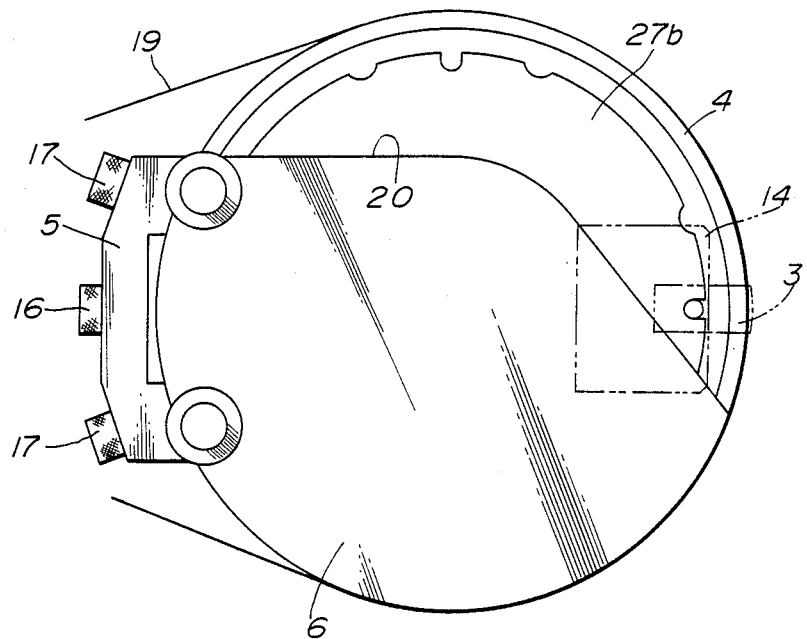
FIG. 2 is a diagrammatic plan view thereof.
Figure 3:
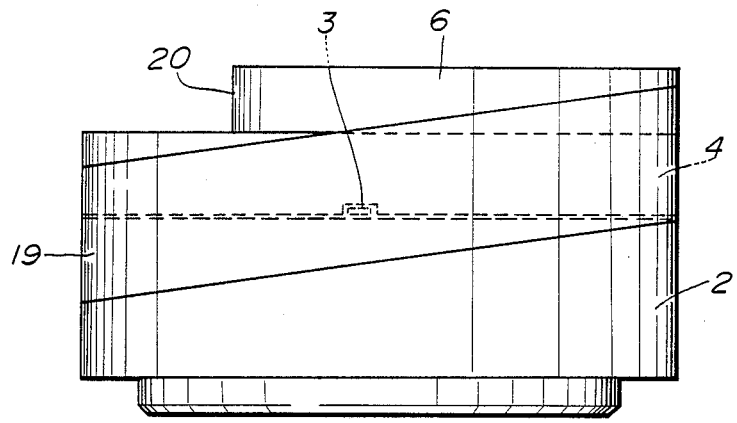
FIG. 3 is a diagrammatic side view thereof.

It is noted that, in a helical scan type rotary magnetic head device, the magnetic tape 19 is wound over a predetermined angular extent, herein over about 180°, on the above described rotary magnetic head device, as shown in FIG. 2. The magnetic tape 19 is caused to run horizontally to or in parallel with the tape cassette mounting or attachment surface along the lateral side of the rotary magnetic head device, which is placed at a predetermined angle relative to the tape cassette mounting surface, as shown in FIG. 3, so that the tape is caused to run as it is wrapped with an inclination of a predetermined angle relative to the central shaft of the rotary magnetic head device. In other words, the tape 19 is caused to run obliquely from the upper end towards the lower end of the rotary magnetic head device. The rotary magnetic head device equipped with the function of guiding the running magnetic tape 19 is so designed and constructed that, for achieving stable guiding of the running tape 19, the tape may be slidingly contacted with the head across its overall width and at any circumferential position over the aforementioned angular extent of sliding contact of the magnetic tape with the head. For this reason, at least a certain portion of the first and third tape guide drums 2, 6 mounted on the top and bottom sides of the drum 4, are completely free from contact with the magnetic tape 19.

To this end, the portion of the third tape guide drum 6 mounted above, the second tape guide drum 4 which is not in contact with the magnetic tape 19 is formed with a cut-away, cut-out or recess 20. As shown in FIG. 2, the recess 20 is formed in such a manner that a portion of the second tape guide drum 4 is exposed towards outside at the portion of the drum 6 not contacted by the magnetic tape including the portion thereof projecting to the uppermost position when the rotary magnetic head device is mounted at a predetermined angle on the tape cassette mounting surface.

A driving electric motor 21, adapted for driving the second tape guide drum 4 and the magnetic head 3 secured to the tape guide drum 4 to revolve the same, is mounted between the first tape guide drum 2 and the bearing housing 10. A rotor magnet 22 forming the driving electric motor 21 is attached to a rotor yoke 23 and has a central cylindrical section 24 fitted to the lower side of the shoulder 12 of the bearing housing 10 mounting the second tape guide drum 4. A stator coil 25 is securely mounted to the inner peripheral surface of the first tape guide drum 2 through the medium of a stator base plate 26 so that the stator coil is in a facing relation with respect to the rotor magnet 22. In this manner, by placing the rotor yoke 23 below the second tape guide drum 4 and also placing the stator coil 25 on the inner peripheral surface of the first tape guide drum 2, the driving electric motor 21 may be disposed substantially within the interior space of the first tape guide drum 2.

A rotary transformer 27, adapted for receiving and/or transmitting recording and/or reproducing signals at and from the magnetic head 3, is disposed between the second and third tape guide drums 4 and 6, as shown in FIG. 1. More in detail, a rotor part 27a of the transformer is mounted on the upper surface of the second tape guide drum 4 opposite to the surface thereof mounting the magnetic head 3, while a stator part 27b is mounted in a facing relation to the rotor part 27a on the lower surface of the third tape guide drum 6 facing to the second tape guide drum 4, for forming the rotary transformer 27. By having the rotor part 27a and the stator part 27b mounted in this manner, the rotary transformer 27 is arranged so as to be enclosed within a space defined between the second and third tape guide drums 4 and 6.

A frequency generator base plate or FG base plate 29 for a frequency generator or FG 28 adapted for producing output signals indicating the rotational speed of the driving electric motor 21 has one end securely mounted to an upper end of an upright peripheral wall 2a of the first tape guide drum 2 contacted by the magnetic tape 19 and has its other end extending into a space defined between the magnetic head 3 and the rotor yoke 23. A frequency generator coil or FG coil, not shown, of the FG 28, is formed in the FG coil base plate 29. An FG magnet 30 forming the FG 28 in conjunction with the FG coil base plate 29 is mounted above the upper surface of the rotor yoke 23 for facing to the FG coil base plate 29. The base plate 29 of the FG 28 is formed of a magnetizable material, such as silicon steel plate, and positioned in the space between the magnetic head 3 and the rotor yoke 23 for intercepting leakage fluxes from the rotor magnet 22 of the driving motor 21. Thus, despite the fact that the driving electric motor 21 and the magnetic head 3 are disposed adjacent to each other, any adverse effect of the leakage magnetic fluxes from the rotor magnet 22 and resulting deterioration in the recording and reproducing characteristics of the magnetic head may be avoided by having the driving electric motor 21 placed in this manner in the inside of the first tape guide drum 2.

Figure 4:
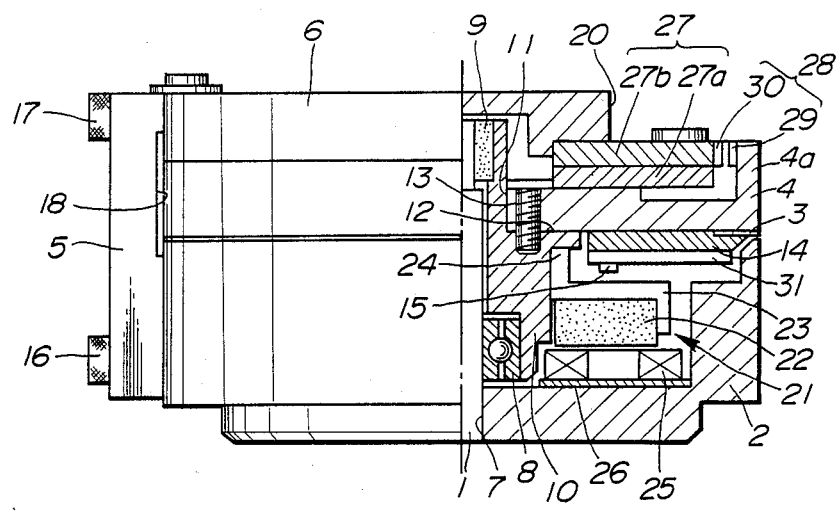
FIG. 4 is a partial longitudinal sectional view of a rotary magnetic head device according to a modified embodiment of the present invention.

In the above embodiment, the FG 28 is mounted in the space between the magnetic head 3 and the rotor yoke 23. Alternatively, as shown in FIG. 4, the FG magnet 30 may be mounted to the outer peripheral surface of the stator part 27b of the rotary transformer 27, with the FG coil base plate 29 being mounted to the inner peripheral wall of the upright peripheral wall 4a of the second tape guide drum 4 contacted by the tape 19, in a facing relation to the FG magnet 30, for forming the FG 28. In this case, the mounting relation between the FG coil base plate 29 and the FG magnet 30 may be reversed to that shown described above. With the FG 28 arranged as described above, the mounting space between the magnetic head 3 and the rotor yoke 23 for mounting the FG 28 may be reduced, while the first and second tape guide drums 2 and 4 may be mounted in closer proximity to each other, so that the overall thickness of the rotary magnetic head device may be further reduced. In the present embodiment, the FG magnet 30 necessitating a higher degree of mounting accuracy need not be mounted to the rotor magnet 22 of the driving electric motor 21, so that the mounting accuracy for the rotor magnet 22 may be released to some extent, while assembly of the driving electric motor 21 is also facilitated.

Figure 5:
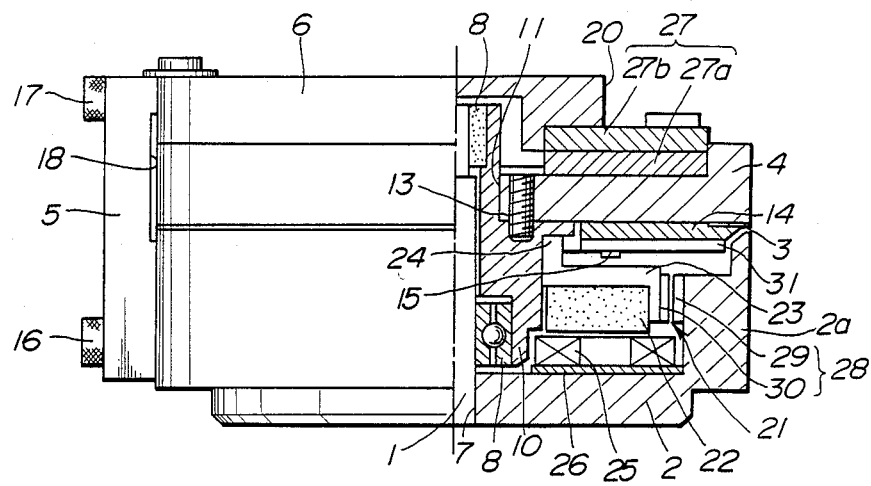
FIG. 5 is a partial longitudinal sectional view of a rotary magnetic head device according to another modified embodiment of the present invention.

Still alternatively, the FG magnet 30 may be mounted to the outer periphery of the rotor yoke 23 of the driving electric motor 21, with the FG coil base plate 29 being mounted to the inner peripheral surface 2a of the first tape guide drum 2 in a facing relation to the FG magnet 30, for forming the FG 28, as shown in FIG. 5.

With the FG 28 arranged as shown in FIGS. 4 and 5, a magnetic shield plate 31 is provided on the lower side of the head attachment plate 14 facing to the rotor magnet 22 to prevent the adverse effect of the leakage fluxes from the rotor magnet 23 on the magnetic head 3.

Figure 6:
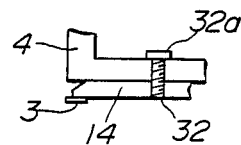
FIG. 6 is a fragmentary view, shown partly in section, and showing the mounting state of the magnetic head and the magnetic head attachment plate.
Figure 7:
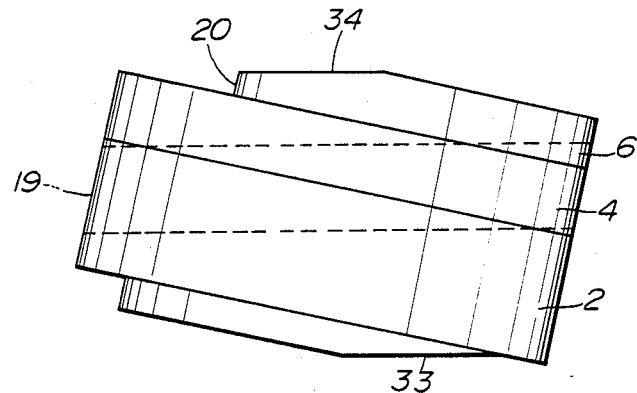
FIG. 7 is a diagrammatic side view showing a further modified embodiment of the rotary magnetic head device according to the present invention.

Referring to FIG. 6, the head attachment plate 14 may be attached to the lower side of the second tape guide drum 4 by a set screw 32 which is introduced from the upper side of the second tape guide drum 4 on the side of the attachment surface for the rotary transformer 27, with the magnetic head 3 being attached to the lower side of the head attachment plate 14. With the head attachment plate 14 and the magnetic head 3 mounted in this manner, the head 32a of the set screw 32 is not projected towards the first tape guide drum 2, so that the space in the first tape guide drum 2 may be enlarged at least by the volume occupied by the projecting portion of the head 32a with the result that the packing density of the various components in the first tape guide drum 2 may be elevated to reduce further the size of the rotary magnetic head device.

It is noted that in a video tape recorder, such as 8 mm VTR, the rotary magnetic head device is mounted with an inclination of a predetermined angle relative to the tape cassette mounting surface, with the magnetic tape 19 running obliquely from the upper to the lower ends of the rotary magnetic head device. For this reason, at least certain portions of the first and third tape guide drums 2 and 6 arranged above and below the second tape guide drum 4 are completely free from contact with the magnetic tape 19. Thus, in conjunction with the cut-out 20 as described above, the portion of the first tape guide drum 2 not contacted by the magnetic tape 19, inclusive of the portion of the drum 2 projecting to the lowermost level when the rotary magnetic head device is mounted at the prescribed angle relative to the tape cassette mounting surface, is cut out at 33 to provide a surface running horizontally and parallel to the tape cassette mounting surface. In addition, the upright surface of the cut-out 20 formed in the third tape guide drum 6 is also cut-out towards the upper surface of the drum 6 to provide a surface 34 running horizontally or parallel to the cut-out surface 33. By forming the cut-out surface 33 and 34 in the first and the third tape guide drums 2 and 6, the height level of the rotary magnetic head device when mounted in the VTR with an inclination of a predetermined angle relative to the tape cassette mounting surface may be advantageously reduced.

What is claimed is:

1. A rotary magnetic head device for magnetic tape comprising:
    a first tape guide drum fixedly supported on a supporting shaft;
    a second tape guide drum supported for rotation relative to said supporting shaft in a facing relation to said first tape guide drum having a surface arranged for engagement with said magnetic tape, said second tape guide drum having an interior and having a magnetic head mounted thereon;
    a third tape guide drum mounted in a facing relation to said second tape guide drum;
    a connecting member for connecting and securing said third tape guide drum to said first tape guide drum, thereby forming a drum assembly with said second guide rotatably arranged between said first and third guide drums;
    wherein a peripheral edge portion of said third tape guide drum not contacted by the magnetic tape is cut-away, whereby a first diagonal dimension of said drum assembly from a point on said third tape guide drum whereat said peripheral edge portion is cut-away to a peripheral edge portion of said first tape guide drum in a cross-section through the axis of rotation thereof is reduced relative to another diagonal dimension substantially normal to said first diagonal from a peripheral edge portion of said third tape guide drum to a peripheral edge portion of said first tape guide in said cross-section thereof, thereby to reduce the height of the rotary head device in an inclined orientation with said cutaway edge portion forming an uppermost edge of said assembly; and
    a rotary transformer having a rotor part mounted within the interior of said second tape guide drum and having a stator part attached to said third tape guide drum in a facing relation to said rotor part, so that said rotary transformer is enclosed by said second tape guide drum.

2. The rotary magnetic head device according to claim 1 further including a frequency generator and driving electric motor having a rotor magnet wherein the frequency generator is provided on the lower side of the magnetic head mounted on said second tape guide drum and on the upper inner peripheral surface of said first tape guide drum facing to said lower side, and wherein said driving electric motor is provided within the interior of said first tape guide drum, said frequency generator intercepting periodically changing leakage fluxes from the rotor magnet of the driving electric motor upon rotation of said second tape guide drum.

3. A rotary magnetic head device according to claim 1 further including a frequency generator provided on an outer peripheral surface of the stator part of the rotary transformer provided to the third tape guide drum and on an inner peripheral surface of said second tape guide drum facing to said outer peripheral surface.

4. A rotary magnetic head device according to claim 1 further including a frequency generator and rotary magnet with a rotor yoke, said frequency generator being provided on an outer peripheral surface of the rotor yoke of the rotary magnet and is rotated in unison with said second guide drum and on an inner peripheral surface of said first tape guide drum facing to said outer peripheral surface.

5. A rotary magnetic head device according to claim 1 further including a slide bearing surrounded by a center hole of said rotary transformer for supporting one of said first and second tape drums on said supporting shaft.

6. A rotary magnetic head device according to claim 1 further including a head attachment plate for mounting said magnetic head to the lower side of said second tape guide drum by a set screw introduced from the upper surface of said second tape guide drum, said upper surface being the surface to which the rotary transformer is attached.

7. A rotary magnetic head device according to claim 1 in which said first tape guide drum is mounted in said inclined orientation at a prescribed angle relative to the surface on the head device on which the magnetic tape engages said device, wherein both the lower end surface of said first tape guide drum and the upper end surface of said third tape guide drum not contacted by said magnetic tape are cut-away, thereby forming respective surfaces parallel to said magnetic tape engagement surface.

* * * * *

UNITED STATES PATENT AND TRADEMARK OFFICE
CERTIFICATE OF CORRECTION

PATENT NO. : 4,891,726

DATED : January 2, 1990

INVENTOR(S) : Hisashi Suwa, Kanagawa

It is certified that error appears in the above-identified patent and that said Letters Patent is hereby corrected as shown below:

Col. 1, line 6, "FIELD" should start new line

Col. 4, line 18, after "above" delete ","

In Claims:

Col. 6, line 62, after "guide" insert --drum--

Signed and Sealed this

Nineteenth Day of February, 1991

Attest:

HARRY F. MANBECK, JR.

Attesting Officer

Commissioner of Patents and Trademarks